United States Patent
Doremus

(10) Patent No.: US 6,202,816 B1
(45) Date of Patent: Mar. 20, 2001

(54) FRICTION CLUTCH EQUIPPED WITH WEAR TAKE-UP DEVICE

(75) Inventor: Olivier Doremus, Izel lez Hameau (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/230,527

(22) PCT Filed: May 28, 1998

(86) PCT No.: PCT/FR98/01072

§ 371 Date: Jan. 27, 1999

§ 102(e) Date: Jan. 27, 1999

(87) PCT Pub. No.: WO98/54479

PCT Pub. Date: Dec. 3, 1998

(30) Foreign Application Priority Data

May 30, 1997 (FR) .................................................. 97 06656
Jun. 5, 1997 (FR) .................................................. 97 06962

(51) Int. Cl.[7] .................................................. F16D 13/75
(52) U.S. Cl. .................................... 192/70.25; 192/111 A
(58) Field of Search ........................... 192/70.25, 111 A, 192/89.24, 112

(56) References Cited

U.S. PATENT DOCUMENTS 5,632,365 * 5/1997 Maucher ........................ 192/70.25

FOREIGN PATENT DOCUMENTS

| 4201132 | 7/1992 | (DE) . |
|---|---|---|
| 2688558 | 9/1993 | (FR) . |
| 2753503 | 3/1998 | (FR) . |
| 2286640 | 8/1995 | (GB) . |
| 2294301 | 4/1996 | (GB) . |
| 2310898 | 9/1997 | (GB) . |

* cited by examiner

*Primary Examiner*—Charles A Marmor
*Assistant Examiner*—Saúl Rodríguez
(74) *Attorney, Agent, or Firm*—Liniak, Berenato, Longacre & White

(57) ABSTRACT

The clutch mechanism for friction clutch comprises a reaction plate, a friction disk (7), a pressure plate (1), a cover (2), clutching means (3), operating axially and controlled by declutching means, operating between the cover (2) and the pressure plate (1) through support means (14), the pressure plate (1) being integral in rotation with the cover (2) while being capable of moving axially relative to it. Said clutch also comprises a wear take-up device comprising ramp means (11), with ramps (15) axially set between the support means (14) and the pressure plate (1), said ramps (15) being adapted to co-operate with counter-ramp means (4) while stop means (20) borne by the cover (2) are provided and adapted to limit the travel of the clutching means (3), in a position for storing the mechanism in the proximity of their operative position.

12 Claims, 4 Drawing Sheets

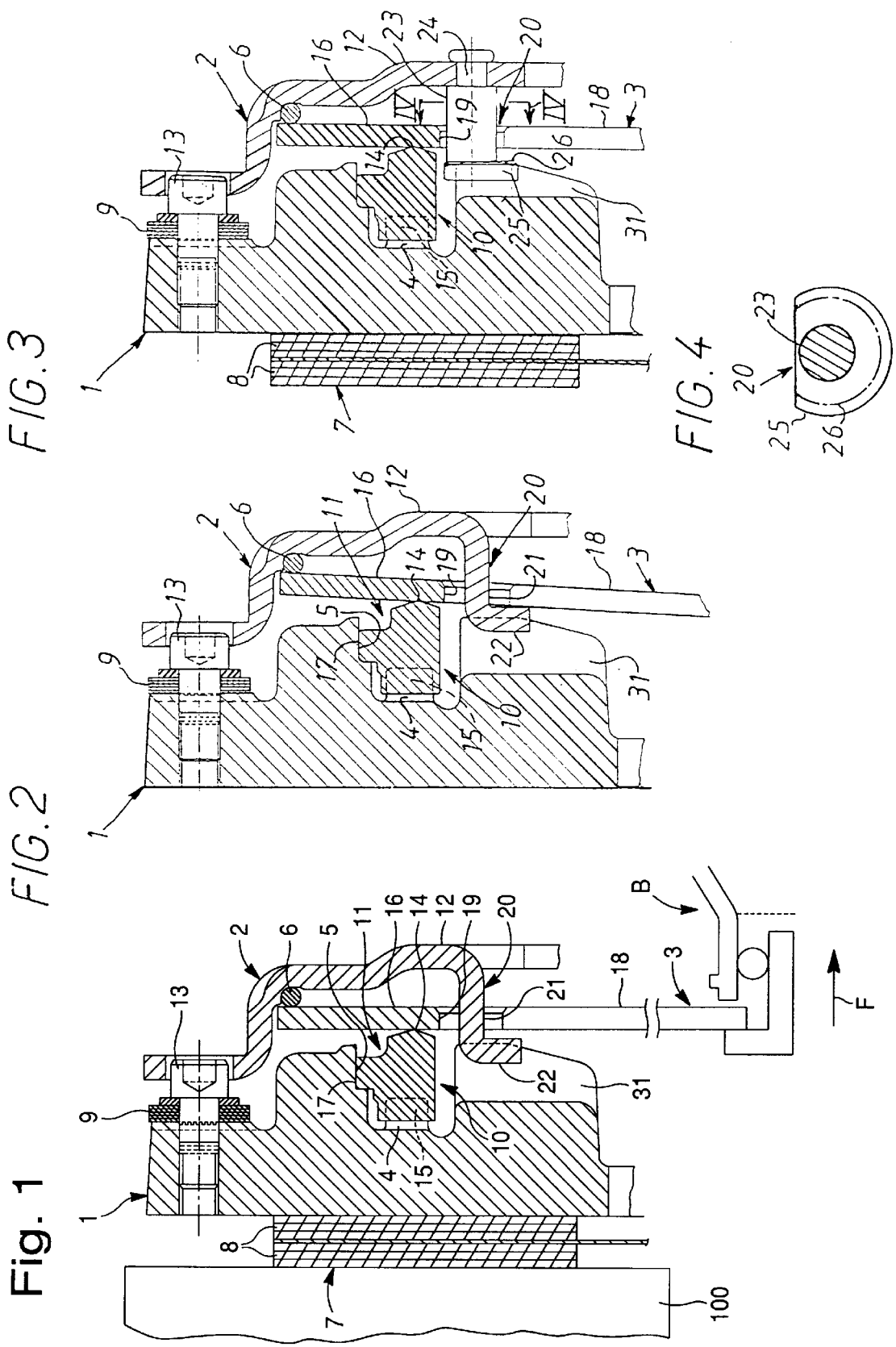

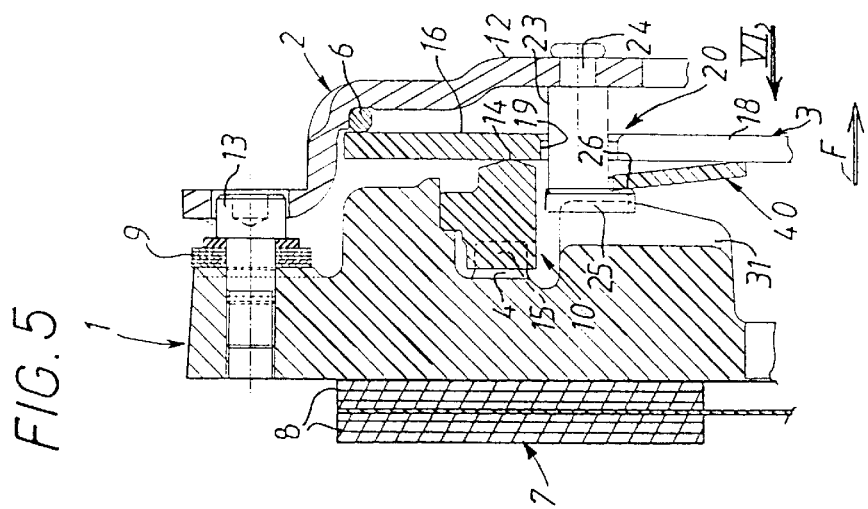
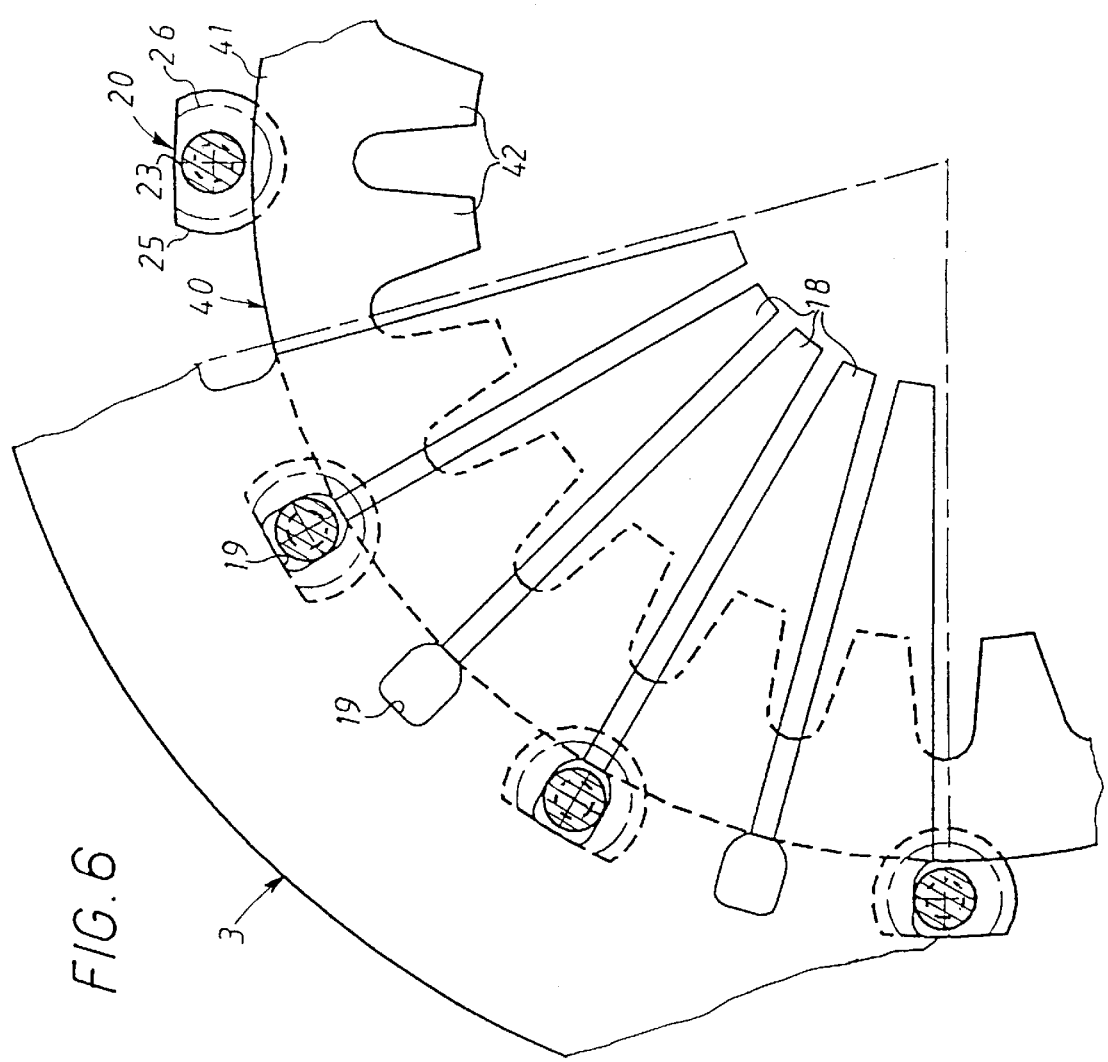

FRICTION CLUTCH EQUIPPED WITH WEAR TAKE-UP DEVICE

BACKGROUND OF THE INVENTION

1. Field of the Invention

The present invention concerns a clutch mechanism for a friction clutch, in particular for a motor vehicle, and relates more particularly to a clutch mechanism equipped with a device for compensating for wear due notably to wear on the friction linings, the said device, hereinafter referred to as the wear take-up device, operating as the said linings wear.

2. Description of Related Art

The conventional friction clutch generally has a reaction plate, possibly in two parts in order to form a damping flywheel, fixed with respect to rotation to a first shaft, usually a driving shaft such as the crankshaft of the internal combustion engine, and supporting through its external periphery a cover to which at least one thrust plate is attached.

The thrust plate is fixed with respect to rotation to the cover and reaction plate whilst being able to move axially under the action of axially acting engagement means and controlled by disengagement means, generally having a metallic diaphragm bearing on the cover, whilst a friction disc, carrying friction linings at its external periphery, fixed with respect to rotation to a shaft, usually a driven shaft such as the input shaft of the gearbox, is interposed between the thrust plate and reaction plate so as to be clamped between them when the clutch is in the engagement position. The diaphragm controls the axial movement of the thrust plate when it is actuated by a clutch release bearing.

During the life of such a clutch, the friction linings, as well as the counter-materials, thrust plate and reaction plate, wear, which causes a variation in the position of the thrust plate and the positions of the axially acting elastic means and of the clutch release bearing, giving rise to a variation in the clamping force between the friction disc on the one hand and the thrust and reaction plates on the other hand, because of the changes in the working conditions of the diaphragm, and the force needed to declutch is affected thereby. By providing such a clutch with a wear take-up device, these drawbacks are avoided, the diaphragm, and the clutch release bearing, usually in constant abutment on the diaphragm, occupying the same position when the clutch is in the engagement position.

There has been proposed, notably in the French patent application FR-A-2 753 503 filed on Sep. 17, 1996 under the number 96 11297, a clutch mechanism for a friction clutch, in particular for a motor vehicle, of the type having a reaction plate intended to be fixed with respect to rotation to a driving shaft, a friction disc, carrying friction linings at its external periphery, intended to be fixed with respect to rotation to a driven shaft, the said mechanism comprising a thrust plate, a cover intended to be fixed to the reaction plate, engagement means, acting axially and controlled by disengagement means, acting between on the one hand the cover and on the other hand the thrust plate by means of abutment means, the thrust plate being fixed with respect to rotation to the cover whilst being able to move axially with respect to it and being subjected to the action of elastic return means returning the thrust plate axially towards the cover, the said mechanism also including a wear take-up device comprising ramp means having circumferentially disposed ramps, the said means being placed axially between the abutment means and the thrust plate, the said ramps being adapted to cooperate with counter-ramp means.

Naturally, the clutch being equipped with a wear take-up device, it is necessary, after it has fulfilled its function, to put it in its so-called zero position corresponding to linings in the new state, after changing the friction disc whose linings have been worn: means have already been provided for this operation to be easy to implement, as is for example described in the French patent application filed on May 30, 1997 under the number 97 06655.

It is advantageous for this operation also to be carried out on the clutch mechanism alone, consisting of the cover, engagement means, the wear take-up device and the thrust plate, constituted a subassembly, before mounting on the reaction plate or flywheel.

Such an operation is difficult when the engagement means, expanding, when the mechanism is in this storage position, in some way axially jam the ramp means against the thrust plate, itself held, with respect to the cover, by the return means or other axial stops.

The clutch mechanism being equipped with a wear take-up device, the engagement means almost always occupy, as explained above, the same working position with respect to the cover. This is taken advantage of by the present invention in order to limit the travel of the engagement means with respect to the cover.

SUMMARY OF THE INVENTION

According to the invention, a clutch mechanism, for a friction clutch of the above type, is characterised by the fact that stop means are provided, carried by the cover and adapted to limit the travel of the engagement means, in the storage position of the mechanism, close to their working position. Thus, because of the presence of the wear take-up device, it is certain that the engagement and/or disengagement means of the mechanism mounted on the reaction plate will not come into contact with the said stop means nor with any element constituting the wear take-up device other than the abutment means.

This arrangement is particularly advantageous where the clutch is of the pulled type, the engagement means having a diaphragm.

In the case of a clutch of the pulled type, in which the diaphragm bears on the cover at points situated radially outwards with respect to the abutment means, in the position of storage of the mechanism the diaphragm has a tendency to move away from the cover; up until now, in order to limit this moving-away travel, it has been proposed, in a clutch mechanism not equipped with a wear take-up device, to provide the thrust plate with stop means placed at its external periphery, adapted to cooperate with the external face of a radial rim on the cover in the storage position of the clutch mechanism: such an arrangement has the drawback that the moving-away travel must be designed to be sufficiently great to enable the thrust plate to move away from the cover in operation as the linings of the friction disc wear; this moving-away travel, still too long in storage, does not facilitate the operation of mounting the mechanism on the reaction plate: in order to avoid having to use long screws for this fixing, storage shims are placed in line with the stop means, which requires fitting and removal operations.

It has also been proposed to limit the moving-away travel of the diaphragm by causing it to cooperate, in storage, with stop means carried by the cover: this is the case notably with certain variants described in the document FR-A-2 135 637; here also the same drawbacks as above are found, the storage shims also being difficult to fit.

The present invention avoids the above drawbacks.

Thus, preferably, the engagement means consist of a diaphragm which bears on the cover at points situated radially outwards with respect to the abutment means, the clutch being of the pulled type.

Advantageously, the stop means consist of lugs issuing from the base of the cover and comprising an axial part which passes through holes in the diaphragm and whose free end is folded in a plane roughly perpendicular to the axis of the clutch in order to constitute a radial rim.

According to a variant, the stop means consist of small columns having a body which passes through holes in the diaphragm, a tail crimped onto the base of the cover and a head on which a stop line is defined which faces the base of the cover and with which the diaphragm is adapted to cooperate in the storage position.

According to another variant, the stop means consist of a ring placed between the thrust plate and the diaphragm and fixed to the base of a cover by rivets passing through holes in the diaphragm.

Preferably, the diaphragm cooperates, in the storage position of the mechanism, directly with the stop means.

Advantageously, the diaphragm cooperates, in the storage position of the mechanism, with the stop means by means of an elastic assistance washer.

According to another variant, the stop means consist of an elastic assistance washer placed axially between the thrust plate and the diaphragm and fixed to the base of the cover by rivets passing through holes in the diaphragm.

When there is an elastic assistance washer, advantageously the elastic assistance washer has, at its internal periphery, extensions delimited by radial slots and intended to cooperate with the fingers of the diaphragm.

Preferably, the elastic characteristics of the assistance washer are chosen so that, when the clutch is engaged, the clutch friction member being new, the action exerted by the assistance washer is very small, or even nil.

Advantageously, the elastic characteristics of the assistance washer are chosen so that, during the declutching operation, the action exerted by the assistance washer increases and then decreases to a given value, which can be very low or even nil, the clutch being disengaged.

Another object of the invention is a subassembly consisting of a cover and diaphragm, in which the diaphragm is in abutment on the cover through its external periphery, a subassembly in which the cover and diaphragm have the characteristics of the cover and diaphragm of the aforementioned mechanism.

BRIEF DESCRIPTION OF THE DRAWINGS

In order to give a better understanding of the object of the invention, a description will now be given, by way of purely illustrative and non-limitative examples, of embodiments depicted in the accompanying drawings, in which:

FIG. 1 is a partial view in section of a clutch mechanism according to the invention, equipped with a wear take up device in its position which corresponds to the engaged state of the clutch, with new linings;

FIG. 2 is a view in section of the clutch mechanism according to FIG. 1 in its storage position;

FIG. 3 is a view similar to FIG. 1 and corresponds to a variant;

FIG. 4 is a view in section along IV—IV in FIG. 3 showing the stop means alone;

FIG. 5 is a view showing the mechanism of FIG. 3 equipped with an assistance washer;

FIG. 6 is a partial view in the direction of the arrow VI in FIG. 5;

DETAILED DESCRIPTION OF THE PREFERRED EMBODIMENTS

Figure 7:
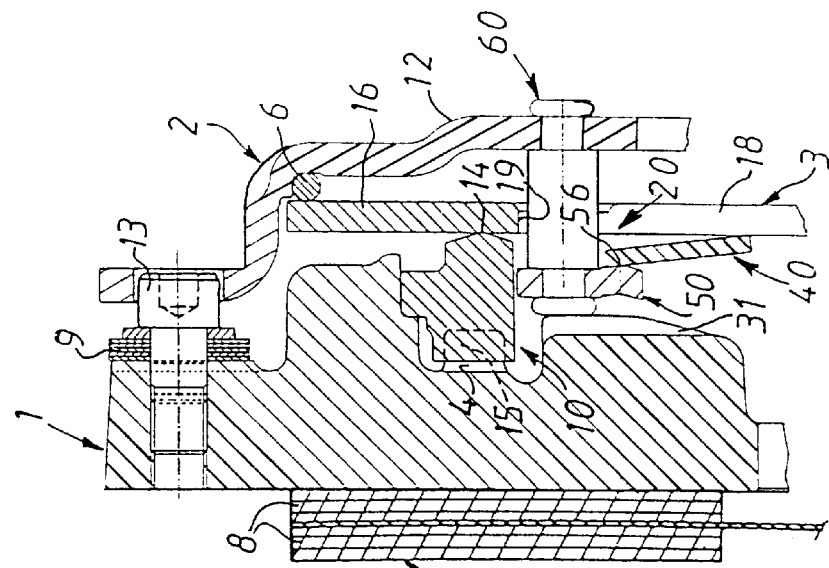
FIG. 7 is a view in section of the clutch mechanism according to FIGS. 5 and 6 in its storage position.

Referring to FIGS. 1 to 4, a friction clutch mechanism can be seen, notably for a motor vehicle, which comprises a thrust plate 1 intended to cooperate with a friction disc 7 carrying at its external periphery friction linings 8, and which itself cooperates with a reaction plate. The reaction plate, depicted schematically at 100 in FIG. 1, is intended to be fixed with respect to rotation to a driving shaft, such as the crankshaft of the internal combustion engine. The friction disc 7 is fixed with respect to rotation to a driven shaft such as the input shaft of the gearbox.

The thrust plate 1 is fixed with respect to rotation to a cover 2, here hollow in shape, by means of tangential tongues 9 which, being elastic, constitute at the same time means of returning the thrust plate 1 towards the cover 2, here metallic and made from pressed metal.

This cover 2 has a base 12 and means for fixing it to the reaction plate, possibly divided in order to form a damping flywheel; this cover 2 is roughly in the form of a hollow dish and has, at its external periphery, a radial rim forming means of fixing the cover 2 to the reaction plate, the said rim being provided with holes for members such as screws to pass for fixing the cover to the reaction plate.

The thrust plate 1, whilst being fixed with respect to rotation to the cover 2, is therefore able to move axially with respect to the cover 2 under the action of the engagement means, axially acting and controlled by disengagement means, here a diaphragm 3 bearing on the cover 2, through the external periphery of its part 16 in the form of a Belleville washer, on a rod 6 placed at the internal periphery of the base 12 of the cover 2, the clutch being of the pulled type; the disengagement operation is effected by acting on the end of the fingers 18, of the diaphragm 3, in the direction of the arrow F in FIG. 1; the Belleville washer 16 of the diaphragm 3 is in contact with a support 14 described below.

In order, when the clutch is engaged, to maintain the axially acting elastic means 3 in a position independent of the wear on the linings 8 of the friction disc 7, and to a lesser extent the wear on the thrust plate 1 and reaction plate, whose so-called friction faces wear in contact with the linings 8 on the disc 7, a wear take-up device 10 is provided.

The wear take-up device 10 comprises ramp means 11 disposed circumferentially; more precisely, these ramp means 11 consist of a ring having ramps 15 disposed circumferentially; the said ring also has abutment areas 14 consisting of a rounded top edge centred on the axis of the clutch placed axially towards the outside with respect to the ramps 15.

The thrust plate has, here cast in one piece, on its face turned towards the base 12 of the cover 2, studs 4 distributed circumferentially at a distance from each other which corresponds to that which circumferentially separates two successive ramps 15, the studs 4 being intended to cooperate each with a ramp 15.

The ramp means 11 are placed axially between the diaphragm 3 and the thrust plate 1 so that the studs 4 receive the ramps 15 and the diaphragm 3 cooperates with the abutment areas 14, which thus constitute the abutment means by means of which the diaphragm 3 acts on the thrust plate 1.

The ramp means 11 have, at their external periphery, a cylindrical wall 17 parallel to the axis of the clutch cooperating with a cylindrical hollow 5 with the same axis, which the thrust plate 1 has on its face opposite the base of the cover 2 so that the ramp means 11 are centred with respect to the thrust plate 1.

The wear take-up device 10 can be of any type; it will simply be indicated here that it can also comprise a ratchet wheel carried by a spindle which also carries a worm, the said spindle being carried by a support being adapted to receive an elastic member in the general shape of a C, one end of which, in the shape of a T, carries at its end a control tongue adapted to cooperate with the teeth on the ratchet wheel.

The thread and pitch of the worm are adapted to teeth carried by a piece of bent metal sheet in the general shape of a flattened Z and fixed by its ends to protrusions on the thrust plate 1. For more information, reference should for example be made to the aforementioned document FR-A-2 753 503, the content of which is considered to be annexed to the present invention.

According to the invention, the clutch mechanism has stop means 20 for, in storage, limiting the travel of the diaphragm 3 with respect to the cover 2 close to its working position; moreover, these stop means 20 prevent any interference between the diaphragm 3 and here the ratchet wheel of the wear take up device 10 located radially below the ramp means 11.

Here, these stop means 20 consist of folded cut lugs issuing from the base 12 of the cover 2.

As is known, the diaphragm 3 comprises a peripheral part 16 in the form of a Belleville washer, which cooperates with the stops 6 and 14 and which is extended towards the inside by fingers 18 separated by radial slots which open out in holes 19 regularly distributed at the internal periphery of the peripheral parts 16 of the diaphragm 3. The holes 19 are wider than the radial slots and form the bases thereof.

The lugs 20 constituting the stop means are regularly distributed peripherally and can be three, four or more in number. The lugs comprise an axial part 21 which passes through holes 19 in the diaphragm 3, whose free end is bent in a plane roughly perpendicular to the axis of the clutch in order to constitute a radial return 22 here directed towards the axis of the clutch; it is with the face of the rim 22 which is turned towards the base 12 of the cover 2 that the diaphragm 3 cooperates in the storage position of the mechanism, as shown in FIG. 2; by limiting the travel of the diaphragm 3 in storage, that of the thrust plate 1 is limited; advantageously, the thrust plate 1 has, opposite the base 12 of the cover 2, radial undercuts 31 in which the radial returns 22 of the lugs 20 can extend.

It will also be appreciated that, by virtue of the invention, there has been produced, in the context of a mechanism of the pulled type, a subassembly comprising the cover 2 and diaphragm 3, which facilitates manipulation as well as the operations of manufacturing the mechanism.

In addition, by virtue of the stop means 20, the diaphragm 3 is centred with respect to the cover, which avoids having to provided special centring means for the diaphragm 3, such as for example axial pins located in the thrust plate 1, as has been done up until now.

According to the variant in FIG. 3, the stop means 20 consist of small columns having a cylindrical body 23 passing through holes 19 in the diaphragm 3, a cylindrical tail 24, with a smaller diameter than that of the body 23, crimped to the base 12 of the cover 2, and a head 25, semicylindrical in shape and with a diameter greater than that of the body 23; on this head 25, on the side which faces the base 12 of the cover 2 there is defined a semicircular stop line 26 for the diaphragm 3, slightly curved in shape.

FIGS. 5 and 6 show the clutch mechanism of FIGS. 3 and 4 incorporating an elastic assistance washer 40 acting in parallel with the diaphragm 3, in order to assist the declutching operation.

The elastic assistance washer 40 bears, on the one hand, on an element which is fixed with respect to the cover 2 and, on the other hand, on the fingers 18 of the diaphragm 3 so that it is adapted to act in the direction of disengagement of the clutch. More precisely, the assistance washer 40 is disposed axially between the diaphragm 3 and the thrust plate 1, being placed radially in line with the fingers 18 of the diaphragm 3, roughly radially inside the area delimited by the holes 19 in the diaphragm 3; here the assistance washer 40 comprises an external Belleville washer part 41 extended radially towards the axis along extensions 42 separated by radial slots; these extensions 42 extend roughly towards the free end of the fingers 18 of the diaphragm 3.

Here, the external periphery of the Belleville washer part 41 of the assistance washer 40 is in abutment on the stop line 26 which faces the base 12 of the cover 2 and which is presented by the head 25 of the small columns 20.

The assistance washer 40 has elastic characteristics such that, when the clutch is engaged and the linings 8 on the friction disc 7 are new, it generates no axial force on the fingers 18 of the diaphragm 3; the clamping force for the linings gripped between the reaction plate and the thrust plate 1 is that which is given by the peripheral part 16 of the diaphragm 3; when the fingers 18 of the diaphragm 30 are acted on in the direction of the arrow F, for disengaging the clutch, the assistance washer 40 acts on the fingers 18 of the diaphragm 3, in the direction of the arrow F, bearing on the cover 2 by means of the small columns 20, thus relieving the force necessary for declutching.

By virtue of the presence of the wear take-up device 10, the positions of the diaphragm 3 and assistance washer 40, on engagement and disengagement, are fixed, independent of the wear on the linings: assistance for declutching supplied by the assistance washer 40 is therefore independent of this wear, as is the clamping force.

Here, in the storage position of the mechanism, shown in FIG. 7, it is by means of the assistance washer 40 that the stop means 20 limit the travel of the diaphragm 3. As can be seen, by virtue of the invention, an assistance washer 40 has been associated with a diaphragm and with a wear take-up device without it being necessary to modify the cover 2; moreover, the latter has been placed in a free space between the thrust plate 1 and diaphragm 3 and its presence has not affected the axial bulk of the clutch mechanism.

Figure 8:
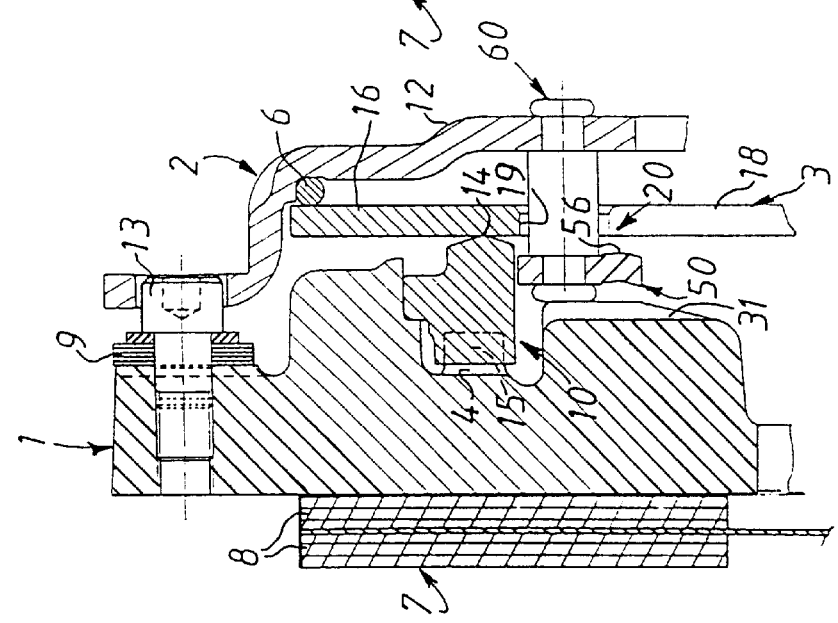
FIG. 8 is a view similar to FIG. 1 and corresponds to another variant.

According to the variant in FIG. 8, the stop means 20 comprise a circular annulus 50, centred on the axis of the clutch mechanism and provided with a circular stop line 56 also centred on the said axis; extending in a transverse plane between the thrust plate 1 and diaphragm 3, the annulus 50 is fixed to the base 12 of the cover 2 by doubly shouldered rivets 60, one shoulder being provided at each end of their body which passes through holes 19 in the diaphragm 3. Each of these ends is crimped, one to the base 12 of the cover 2, the other to the annulus 50.

Figure 9:
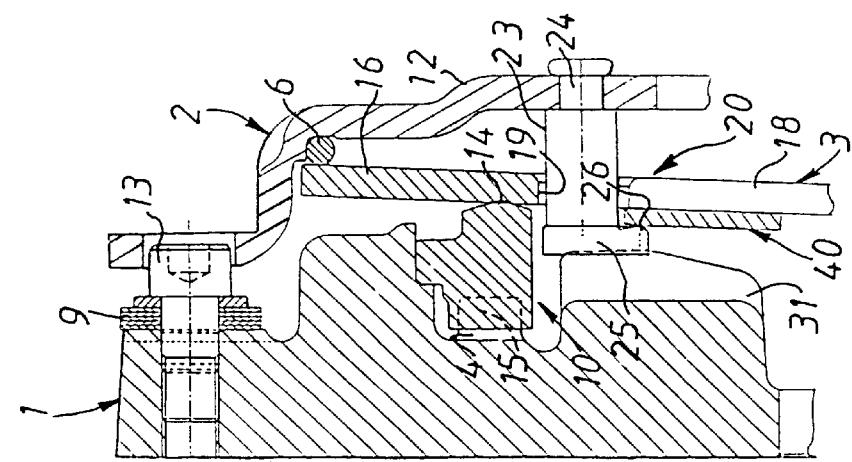
FIG. 9 is a view showing the mechanism of FIG. 8 equipped with an assistance washer.

FIG. 9 shows a variant of the mechanism of FIG. 8 equipped with an assistance washer 40, similar to that described with regard to FIGS. 5 to 7.

Figure 10:
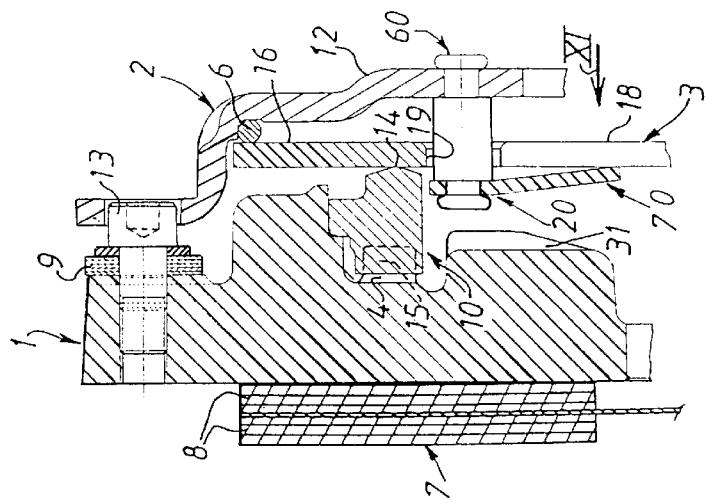
FIG. 10 is a view similar to FIG. 1 and corresponds to yet another variant, the mechanism being equipped with an assistance washer.
Figure 11:
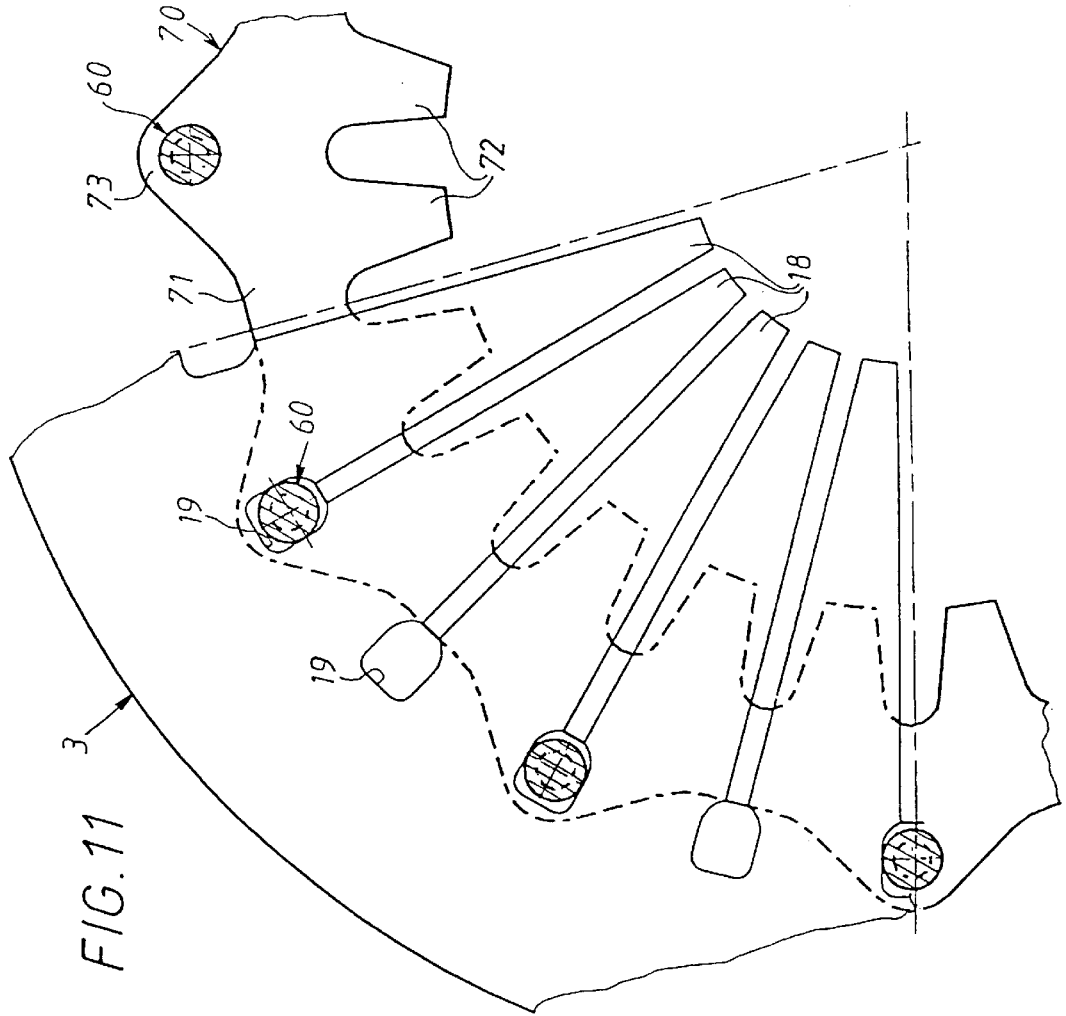
FIG. 11 is a partial view in the direction to the arrow XI in FIG. 8.

According to the variant in FIGS. 10 and 11, the stop means 20 comprise an assistance washer 70; this assistance washer 70 has a peripheral part 71 extended internally by radial extensions 72 which cooperate with the fingers 18 of the diaphragm 3; advantageously, there are as many extensions 72 as diaphragm fingers 18, this being valid also for the assistance washer 40 in FIGS. 5 to 7 and 9; at its external periphery, the assistance washer 70 has attachment areas 73 for fixing it to the base 12 of the cover 3 by rivets 60 similar to those in FIGS. 8 and 9. Thus, according to this variant, it is the assistance washer 70 itself which in storage limits the travel of the diaphragm.

Naturally, these structures can be reversed; for example, the return 22 in FIG. 1 can be directed radially towards the outside; the rod 6 can be formed directly by press forming of the cover.

The cover is not necessarily hollow in shape. For example, the reaction plate can have, at its external periphery, an axially oriented annular skirt to which the cover is fixed.

Likewise, a mechanism has been described in which the engagement and disengagement means are produced in a single piece, the diaphragm 3. The engagement means and the disengagement means can be formed independently: for example, the engagement means can consist of a Belleville washer or helical springs, and the disengagement means of levers or a false diaphragm, that is to say a diaphragm whose peripheral part in the form of a Belleville washer has no elasticity, because for example of the presence in this part of slots opening up to the outside.

What is claimed is:

1. Clutch mechanism for a friction clutch, having a reaction plate (100), a friction disc (7), carrying friction linings (8) at its external periphery (8), said mechanism comprising a thrust plate (1), a cover (2) intended to be fixed to the thrust plate, axially acting engagement means (3) for bearing on the cover (2) and controlled by a disengagement member, acting between on the one hand the cover (2) and on the other hand the thrust plate (1) by means of an abutment member (14), the thrust plate (1) being fixed with respect to rotation to the cover (2) whilst being able to move axially with respect to it and being subjected to the action of elastic return means (9) returning the thrust plate (1) axially towards the cover (2), said clutch also having a wear take-up device comprising ramp means (11) having circumferentially disposed ramps (15) placed axially between the abutment means (14) and the thrust plate (1), the same ramp (15) being adapted to cooperate with counter-ramp means (4), characterized by the fact that there are provided stop means (20) carried by the cover (2) and adapted to limit the travel of the engagement means (3), in a storage position of the mechanism when the thrust plate does not engage a friction plate, away from the cover (2) and close to their working position.

2. Clutch mechanism according to claim 1, characterized by the fact that the engagement means have a diaphragm (3) which bears on the cover (2) at points (6) situated radially towards the outside with respect to the abutment members (14), the clutch being of the pulled type.

3. Clutch mechanism according to claim 2, characterized by the fact that the stop means (20) consists of lugs issuing from a base (12) of the cover (2) and comprising an axial part (21) which passes through holes (19) in the diaphragm (3) and whose free end is in a plane roughly perpendicular to the axis of the clutch in order to constitute a radial rim (22).

4. Clutch mechanism according to claim 2, characterized by the fact that the stop means (20) consist of small columns having a body (23) which passes through holes (19) in the diaphragm (3), a tail (24) crimped to a base (12) of the cover (2) and a head (25) on which there is defined a stop line (26) which faces a base (12) of the cover (2) and with which the diaphragm (3) is adapted to cooperate in the storage position.

5. Clutch mechanism according to claim 2, characterized by the fact that the stop means (20) consists of an annulus (50) placed between the thrust plate (1) and the diaphragm (3) and fixed to a base (12) of the cover (2) by rivets (60) passing through holes (19) in the diaphragm (3).

6. Clutch mechanism according to claim 2, characterized by the fact that the diaphragm (3) cooperates, in the storage position of the mechanism, directly with the stop means (20).

7. Clutch mechanism according to claim 2, characterized by the fact that the diaphragm (3) cooperates, in the storage position of the mechanism, with the stop means (20) by means of an elastic assistance washer (40).

8. Clutch mechanism according to claim 2, characterized by the fact that the stop means (20) consist of an elastic assistance washer (70) placed axially between the thrust plate (1) and the diaphragm (3) and fixed to a base (12) of the cover (2) by rivets (60) passing through holes (19) in the diaphragm (3).

9. Clutch mechanism according to claim 7, characterized by the fact that the elastic assistance washer (40, 70) has, at its internal periphery, extensions (42, 72) delimited by radial slots and intended to cooperate with the fingers (18) of the diaphragm (3).

10. Clutch mechanism according to one of claims 7 to 9, characterized by the fact that the elastic characteristics of the assistance washer (40, 70) are chosen so that, when the clutch is engaged, the clutch friction member being new, the action exerted by the assistance washer (40, 70) is very small or even nil.

11. Clutch mechanism according to one of claims 7 to 10, characterized by the fact that the elastic characteristics of the assistance washer (40, 70) are chosen so that, during the declutching operation, the action exerted by the assistance washer (40, 70) increases and then decreases to a given value which can be very small or even nil, the clutch being disengaged.

12. Subassembly consisting of a cover and a diaphragm, in which the diaphragm is in abutment on the cover through its external periphery, characterized by the fact that the cover and diaphragm have the characteristics of the cover (2) and diaphragm (3) of the mechanism according to claim 2.

* * * * *